US007769165B2

(12) United States Patent
Jakubowski et al.

(10) Patent No.: US 7,769,165 B2
(45) Date of Patent: Aug. 3, 2010

(54) SEMI-PUBLIC WHITE-BOX CIPHER

(75) Inventors: Mariusz H. Jakubowski, Bellevue, WA (US); Ramarathnam Venkatesan, Redmond, WA (US); Gideon A. Yuval, Mercer Island, WA (US); Yacov Yacobi, Mercer Island, WA (US); Matthew Cary, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1275 days.

(21) Appl. No.: 11/251,625

(22) Filed: Oct. 14, 2005

(65) Prior Publication Data

US 2007/0086586 A1 Apr. 19, 2007

(51) Int. Cl.
*H04K 1/00* (2006.01)
*H04L 9/00* (2006.01)
*H04L 9/28* (2006.01)

(52) U.S. Cl. .......................... 380/28; 708/144; 708/250

(58) Field of Classification Search .................. 380/28, 380/30, 37, 44, 46, 255, 259, 264, 277; 713/189–194
See application file for complete search history.

(56) References Cited

U.S. PATENT DOCUMENTS

| 6,751,319 | B2 * | 6/2004 | Luyster | 380/37 |
| 7,006,633 | B1 * | 2/2006 | Reece | 380/260 |
| 7,177,424 | B1 * | 2/2007 | Furuya et al. | 380/37 |
| 7,397,916 | B2 * | 7/2008 | Johnson et al. | 380/28 |
| 2003/0223580 | A1 * | 12/2003 | Snell | 380/28 |
| 2004/0193898 | A1 * | 9/2004 | Ochi et al. | 713/189 |
| 2005/0065890 | A1 * | 3/2005 | Benaloh | 705/51 |

OTHER PUBLICATIONS

Stanley Chow, Philip Eisen, Harold Johnson, and Paul C. Van Oorschot, "White-Box Cryptography and an AES Implementation", 2003, Published by Springer, pp. 250-270.*
Jacob, et al, "Attacking an Obfuscated Cipher by Injecting Faults".
Link, et al, "Carifying Obfuscation: Improving the Security of White-Box Encoding", Sandia National Laboratories.
Chow, et al, "A White-Box DES Implementation for DRM Applications", Cloakware Corporation, Ottawa, CA and Carleton University, Ottawa, CA, 2002.

* cited by examiner

*Primary Examiner*—Kimyen Vu
*Assistant Examiner*—Chi Nguy
(74) *Attorney, Agent, or Firm*—Lee & Hayes, PLLC (57) ABSTRACT

A computer-implemented system and method for configuring and operating a white-box cipher is disclosed. In one implementation, the system employs a method for configuring pseudorandom data derived from a key to perform key-scheduling functionality associated with rounds of the cipher. Additionally, the system employs a method for generating white-box executable code, wherein the code hides the pseudorandom data by incorporating it into mathematical operations performed during execution of the rounds. Accordingly, the cipher is suited for white-box applications managing digital rights, such as decoding audio, video and other content.

14 Claims, 6 Drawing Sheets

SEMI-PUBLIC WHITE-BOX CIPHER

BACKGROUND

Cryptographic systems are required for enforcement of Digital Rights Management (DRM). Such systems may be used to protect digital works, such as motion pictures, music, and/or software from unauthorized use. Discovery of a key to such a system allows software to be executed, motion pictures to be viewed and music to be listened to, etc., all without payment of legally required royalties.

A "white-box" device can be configured to use a key to encrypt or decrypt data. Such a device could be used to play music or a movie on a PC, for example. Similarly, a white-box might be part of (or associated with) a software application. Unlike a black box, for which only the inputs and outputs are known, much can be discovered about the operation of a white-box. In particular, a white-box is a device that is potentially in the possession of an adversary, and may be carefully observed and/or probed. If successful, the adversary may extract a key from the white-box, and utilize the key with other white-boxes installed on other computer systems, thereby evading royalty and fee payment on a large scale.

Typically, keys contained within a white-box comprise small, self-contained, amounts of data. Unfortunately, keys are not adequately protected by the AES (Advanced Encryption Standard), particularly in a white-box environment wherein observation of sub-keys used in rounds can reveal the identity of the key. This is not unexpected, since neither AES nor DES was designed with white-boxing in mind—i.e., these ciphers and most others were not intended to hide their keys. Therefore, while AES is an advancement over its predecessor, the Data Encryption Standard (DES), a need still exists for an encryption system that better protects software and content from unlawful attack.

SUMMARY

A computer-implemented system and method for configuring and operating a white-box cipher is disclosed. In one implementation, the system employs a method for configuring pseudorandom data derived from a key to perform key-scheduling functionality associated with rounds of the cipher. Additionally, the system employs a method for generating white-box executable code, wherein the code hides the pseudorandom data by incorporating it into mathematical operations performed during execution of the rounds. Accordingly, the cipher is suited for white-box applications managing digital rights, such as decoding audio, video and other content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
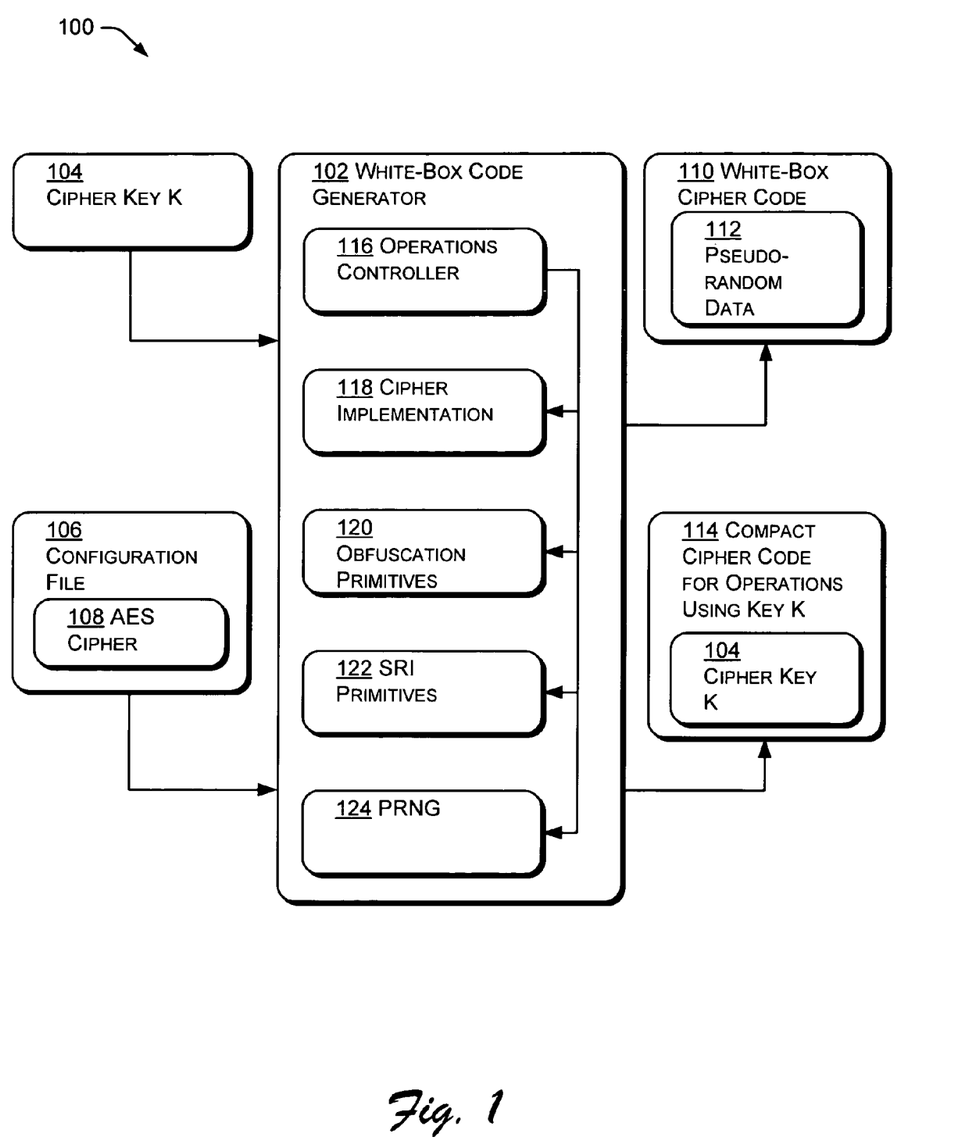
FIG. 1 is a block diagram illustrating an example of a system for configuring a white-box cipher.

FIG. 1 is a block diagram illustrating an example of a system 100 for configuring a white-box cipher. A white-box code generator 102 is configured to receive input including a cipher key K 104 and a configuration file 106, which may include an existing (perhaps AES) cipher 108. Using these inputs, the white-box code generator 102 creates white-box cipher code 110 and/or compact cipher code 114. For example, the white-box code generator 102 may be configured to convert an existing cipher 108 that performs key scheduling into white-box cipher code 110 or compact cipher code 114. The white-box cipher code 110 is adapted for use in white-box applications, and performs key-scheduling functionality using pseudorandom data 112. Accordingly, the white-box code 110 is segregated from the key K 104, thereby preventing the extraction of that key from the white-box code 110. Instead, the white-box cipher code 110 performs key-scheduling with the pseudorandom data 112, which cannot be reversed to derive the initial key K 104 without breaking a pseudorandom number generator. Thus, in one implementation, the original cipher key data (e.g. 128 bits in an AES application) is replaced by pseudorandom bits 112, which in many embodiments or implementations are much more voluminous (e.g. 1408 bits) than the original key data. In a second embodiment, the cipher 110 can be extended to use additional key-scheduling data (e.g. additional pseudorandom bits 112) of a user-controllable and arbitrary length. As will be seen in greater detail infra, the pseudorandom data 112 is well-hidden within the white-box cipher code 110, making its extraction very difficult. In contrast, the compact cipher code 114 is adapted for use on a secure system, such as a server behind a firewall. This security allows use of the original cipher key within the compact cipher executable code, with the pseudorandom data derived from the key at runtime. Therefore, in one embodiment, the original cipher key 104, not the pseudorandom data 112 derived from the key, is present in the compact private cipher code 114. The white-box code generator 102 can be configured to provide for user selection between creation of the white-box code 110 or compact code 114.

The cipher key K 104 may be any cipher key; however, a 16-byte key associated with an AES (Advanced Encryption Standard) is typically utilized. The configuration file 106 includes implementation-specific information, such as user-defined security parameters, as well as design and arrangement aspects of an existing cipher (typically an AES cipher configured for key-scheduling) that is being converted for white-box use.

In the example of the white-box code generator 102 seen in FIG. 1, an operations controller 116 coordinates the operation of a cipher implementation 118, obfuscation primitives 120, SRI (software resistance to interference) primitives 122 and a PRNG (pseudorandom number generator) 124. The cipher implementation 118 may include a cipher that is being converted for use as a white-box. In general, the cipher implementation 118 should be of a type that includes key-scheduling. In particular, AES (Advanced Encryption Standard) ciphers are typically well-adapted for use. In one example of the implementation of the white-box code generator 102, the cipher implementation 118 is configured using data and/or code from the cipher 108 input as part of the configuration file 106.

The obfuscation primitives 120 include a set of procedures that enable functions to be performed in a manner that hides what is really being done. In a very simple example, an obfuscation primitive for multiplication by 5 could include two left shifts (of the underlying binary value, thereby multiplying by four) followed by addition to the original number. While this example is very simple and not secure, extension of this concept can be made to produce arbitrarily complex results. Thus, the obfuscation primitives can be used to hide the pseudorandom key 112 within the white-box cipher code 110.

The SRI (software resistance to interference) primitives 122 are a set of methods that enable the white-box cipher code to verify the integrity and correctness of its execution at runtime. For example, the technique of oblivious hashing can be used to compute and verify checksums of program state and control flow. This is to hinder dynamic attacks that alter program data or execution paths at runtime as a means of analysis.

A PRNG (pseudorandom number generator) 124 is configured to receive a relatively short key as input and provide a relatively long stream of pseudorandom numbers as output. In one example, the cipher key K 104 may be used as the seed to the PRNG 124, resulting in pseudorandom key data 112. For example, a 16-byte key 104 may be used to create a 176-byte pseudorandom string 112. The pseudorandom data 112 can be used to replace the key-scheduling data in the underlying AES cipher 108. A basic assumption is that recovery of the key 104 from the output of the PRNG 124 is an intractable problem. It is similarly assumed that an adversary in possession of the expanded key 112 cannot compress that key to result in a size comparable to the length of the original AES key 104.

Figure 2:
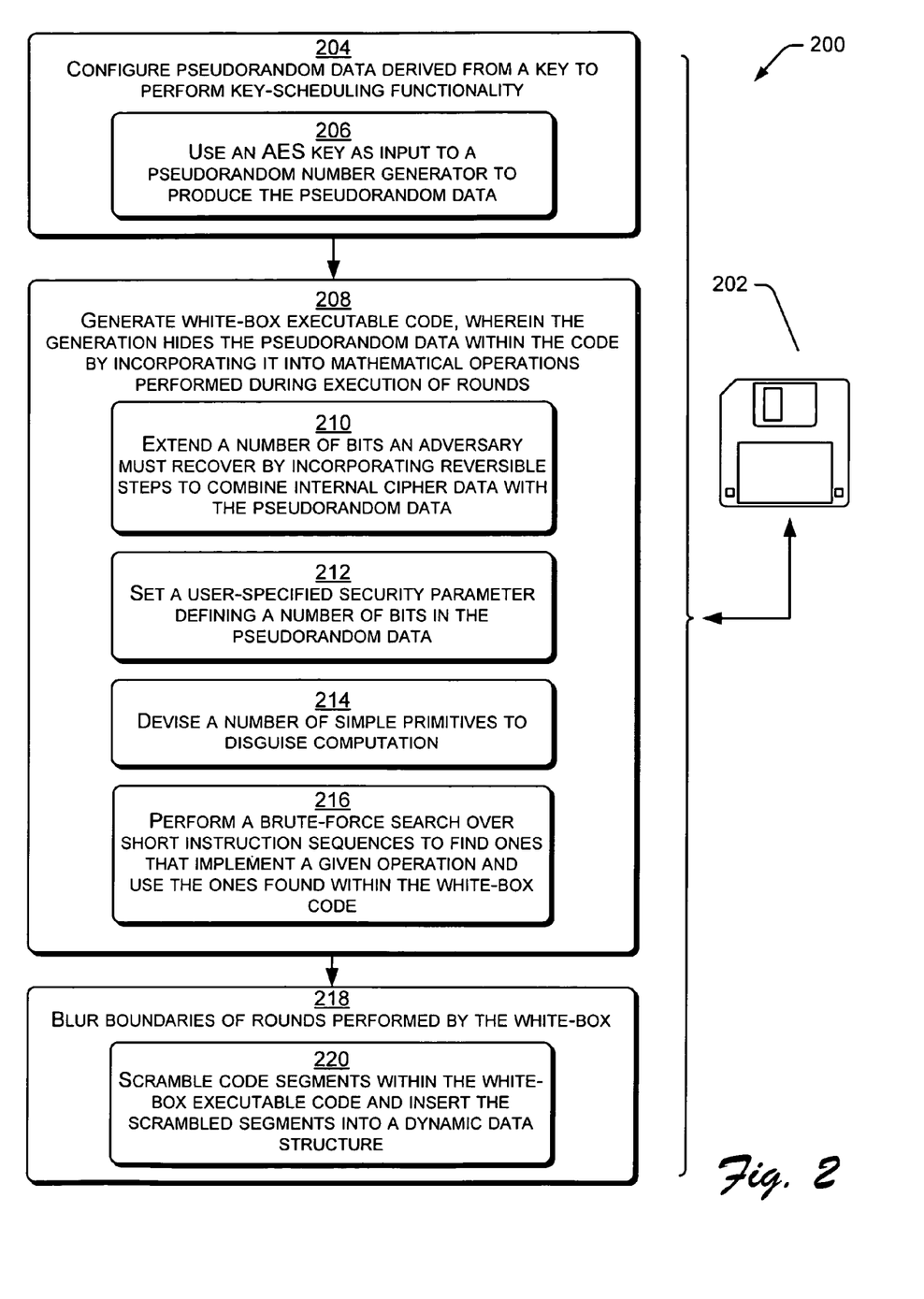
FIG. 2 is a flowchart showing an example method by which a white-box cipher can be configured.

FIG. 2 is a flowchart showing an example method 200 by which a white-box cipher (e.g. the cipher 110 of FIG. 1) can be configured. In one example, the method of configuration is performed by operation of a white-box code generator, such as generator 102 of FIG. 1. The methods described herein may be performed by a computer, processor, controller or related device, such as an application specific integrated circuit (ASIC). In a typical example, the methods are performed by application of computer-executable instructions, which are stored on computer-readable media 202. As used herein, a computer and/or processor-readable medium can be any means that can contain or store instructions for use by or execution by a processor. The processor-readable medium 202 can be, without limitation, electronic, magnetic or optical. More specific examples of a processor-readable medium include, among others, a portable computer diskette, a random access memory (RAM), a read-only memory (ROM), an erasable programmable-read-only memory (EPROM or Flash memory), a rewritable compact disc (CD-RW), and a portable compact disc read-only memory (CDROM). Once configured, the white-box cipher can be used to decode content by performing rounds using pseudorandom data for key-scheduling. For example, music or a motion picture may be decoded by performing rounds according to the key-scheduling indicated by the pseudorandom data.

At block 204, pseudorandom data, derived from a key, is configured to perform key-scheduling functionality. Referring for purposes of illustration to the example of FIG. 1, the cipher key 104 is used by the PRNG 124 to generate pseudorandom data 112. This can be performed as seen in the example implementation of block 206, wherein an AES key is used as input to a pseudorandom number generator to produce the pseudorandom data.

At block 208, white-box executable code is generated. In a typical example, the code is generated in a manner that hides the pseudorandom data within the code. This may be performed by incorporating the pseudorandom data into mathematical operations performed during execution of rounds. In the example of FIG. 1, this may be accomplished by use of the obfuscation primitives 120 and the SRI primitives 122 configured within the white-box code generator 102. Blocks 210-216 disclose optional aspects of white-box code generation. At block 210, a number of bits an adversary must recover may be extended by incorporating reversible steps into mathematical operations performed during execution of rounds. In an AES cipher, the adversary must recover the 16-byte key. Having recovered the key, the adversary is free to use the key in an AES cipher installed on any convenient computer, and to thereby decode content at will. The relatively short length of the AES key aids in this process. As was seen in block 204, the key can be replaced by, and its key-scheduling functionality assumed by, the pseudorandom data of much longer length than the original key. By replacing key-scheduling data (typically derived from a segment of the key K in most AES applications) with the pseudorandom data, the adversary is forced to recover at least the number of bits in the expanded key. For example, a 128-bit key associated with a typically AES application may result in 1408 bits of pseudorandom data. At block 210, the pseudorandom data is extended further. To ensure that the adversary must perform a hack of a certain minimal size, the amount of data is extended beyond the pseudorandom data by incorporation of additional reversible steps to combine internal cipher data with the pseudorandom stream. To ensure the minimal size, the steps must be selected to avoid reduction to simpler operations that combine, compress or discard parts of the pseudorandom data.

In a specific example of block 210, where the key (e.g. cipher key K 104 of FIG. 1) is a 128-bit key in an AES cipher, the following reversible steps may be utilized to extend the number of bits an adversary must recover. After each of the first two transformations in each AES round, inject an XOR of the AES state with 128 pseudorandom bits. This provides 2432 additional bits (i.e. 10*2*128−128=2432 bits) for an adversary to recover. (Note that even though each AES round (except the last) consists of four operations, any XORs of the state after the last two operations can be eliminated by pre-processing the expanded key.) Additional AES transformations may be inserted into each round, along with the above XORs. Additional AES rounds may be inserted to augment the above extra transformations. Insertion of additional AES transformations and rounds extends the key size (e.g. pseudorandom key 112 of FIG. 1) arbitrarily in a white-box implementation (e.g. white-box cipher code 110 of FIG. 1). However, without such extension of the key size, the fixed-size compact implementation (e.g. compact cipher code 114 of FIG. 1) is configured in a more compact manner. Because the key size may be extended arbitrarily, key size may be configured via a user-selected security parameter. Accordingly, in the example of block 212, a user-selected security parameter is set, thereby defining a number of bits in the pseudorandom data. The number of bits represents a lower bound on an amount of key data an adversary must extract in order to emulate operation of the white-box. The user-selected security parameter may be selected during the course of operating the white-box code-generation tool 102 (FIG. 1).

At block 214, a number of simple primitives are devised to disguise computation. Primitives may be developed for, and substituted for, almost any function. As seen above, a primitive (e.g. the simple example of left-shifting twice and adding to the original term) may be configured for substitution for multiplication by five. Similarly, a number of additional primitives may be developed, and used to disguise any computation. Referring briefly to FIG. 1, these primitives may be organized as obfuscation primitives 120, and managed by the white-box code generator 102. In a variation, at block 216 a brute-force search is performed over short instruction sequences to find ones that implement a given operation. Once found, the short instruction sequence is used in the white-box code (e.g. code 110 of FIG. 1). Typically, multiple such sequences may be found, in which case one can be selected randomly. This is similar to the compiler technique of superoptimization, which searches exhaustively for shortest instruction sequences to implement simple functions.

Figure 3:
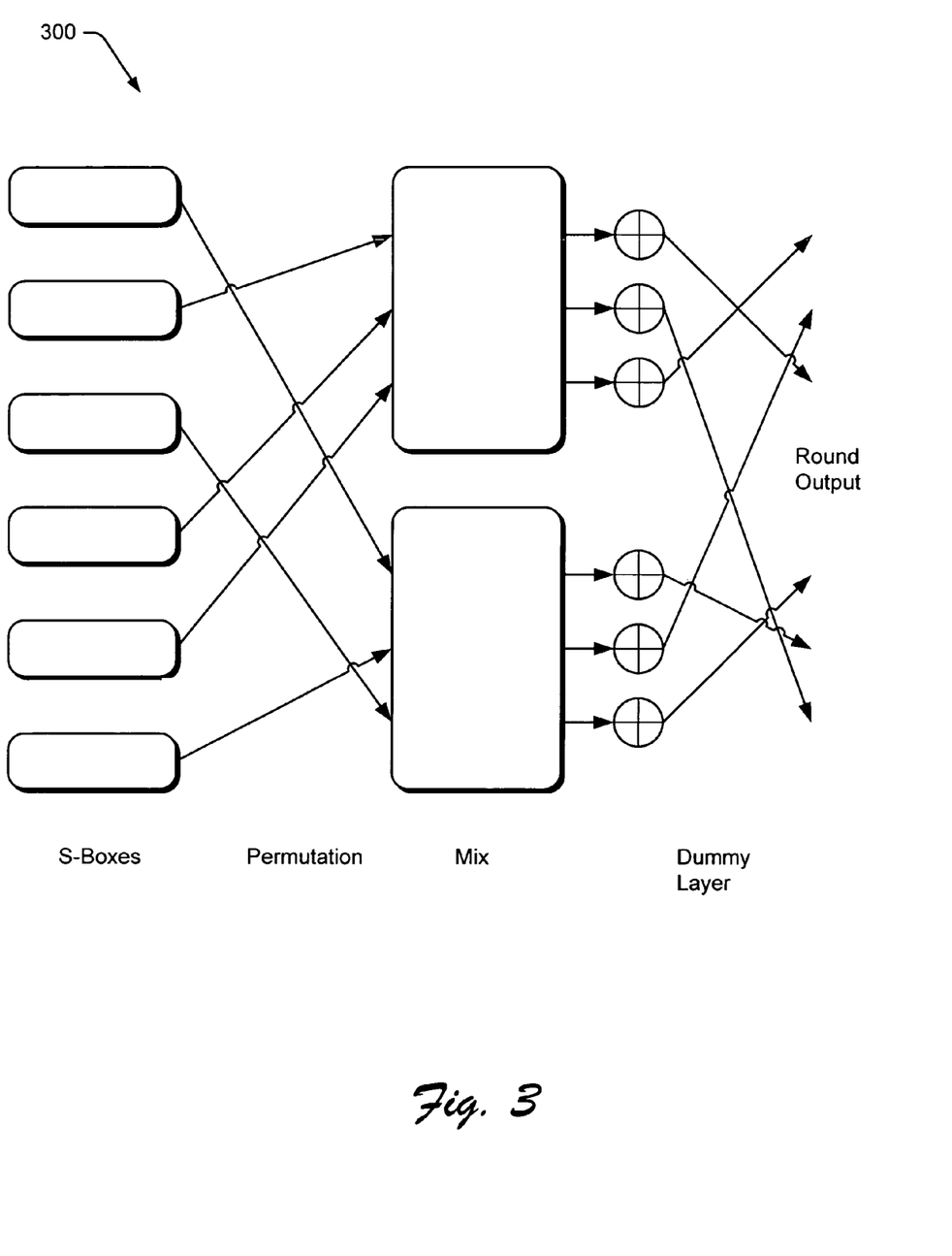
FIG. 3 is a block diagram showing aspects of an AES round.

At block 218, boundaries of rounds performed by the white-box are blurred. In one example seen at block 220, code segments within the white-box executable code are scrambled, and the scrambled code segments are inserted into a dynamic data structure. Accordingly, the boundaries of the rounds performed by the white-box are blurred. Blurring round boundaries is desirable, since an adversary's knowledge of round boundaries enabled application of differential cryptanalysis to break the Chow et. al. obfuscation as shown in Jacob et. al. The blurring of round boundaries in the obfuscation system herein disclosed prevents this attack. The importance of blurring boundaries between rounds can be understood by reference to the example AES round 300 seen in FIG. 3. It may be possible for an adversary to identify a state at the end of the round. Some dummy operations may be present after the mix, but no dummy state is present. By comparing inputs that differ at one byte, it can be seen that the outputs change. By varying overall input bytes, it may be possible to find all inputs that permute to a column. If the adversary can guess 32 dummy XOR bits for that MixColumn and guess input-output permutation, the adversary can invert the known MixColumn operation. The 32 XOR bits can be obtained by a brute-force search over $2^{32}$ bits, which can be performed very rapidly. The guesses can then be confirmed, and the S-Box entries reconstructed by varying each byte. While the above attack is difficult, it may be possible.

Figure 4:
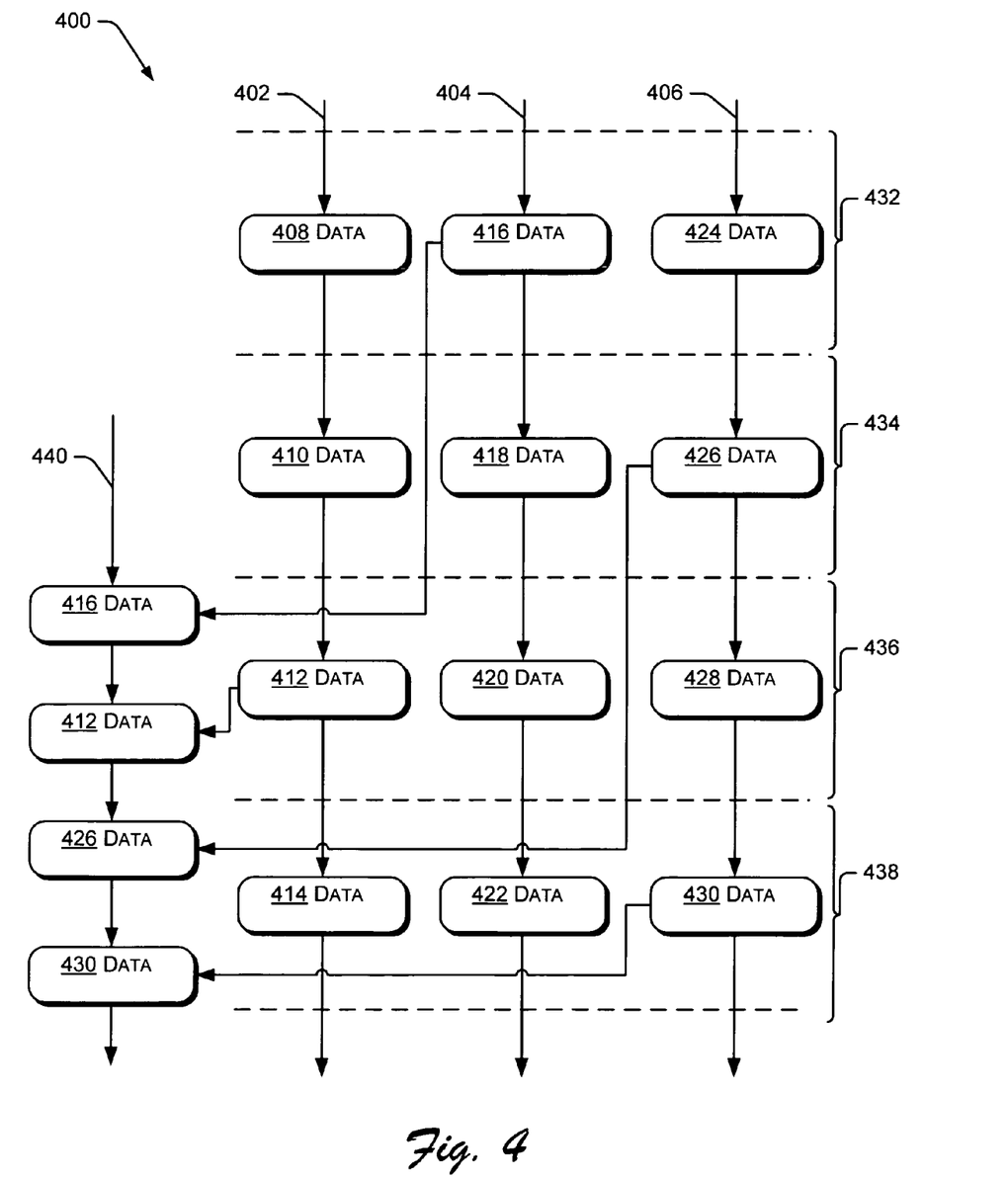
FIG. 4 is a block diagram showing aspects by which code segments of a white-box cipher can be scrambled, thereby blurring the boundaries between rounds performed by the white-box.

The operation of blocks 218 and 220 can be understood in part by reference to FIG. 4. In particular, FIG. 4 is a block diagram 400 showing an example method by which code segments of a white-box cipher can be scrambled, thereby blurring the boundaries between rounds performed by the white-box. In particular, three tracks 402-406 of data 408-430 within four rounds 432-438 are shown. In one implementation, only one of the three tracks in each round is actually useful for the cipher operation, while the other two tracks serve to obfuscate round boundaries. The data 408-430 are scrambled in a random manner, thereby forming an output track 440, wherein blocks 416, 412, 426 and 430 have been assembled in a random manner. The data in the output track 440 is representative of data contained within a dynamic data structure, wherein data position within the data structure and data values are cryptographically random with respect to the key, input, and round in which the data was generated. The dynamic properties of such a dynamic data structure can prevent easy static analysis. The cryptographically random dynamic properties prevent dataflow, fault-injection and other dynamic analysis by making the results of such analysis computationally independent. Thus, the data in the output track 440 is representative of data contained within a dynamic data structure, wherein data position within the data structure does not reveal the round 432-438 from which the data was generated. Such a dynamic data structure can be configured for hiding and homogenizing data-access patterns to prevent easy static and/or dynamic analysis (e.g. dataflow and fault-injection attacks, which are commonly used against white-box applications).

Figure 5:
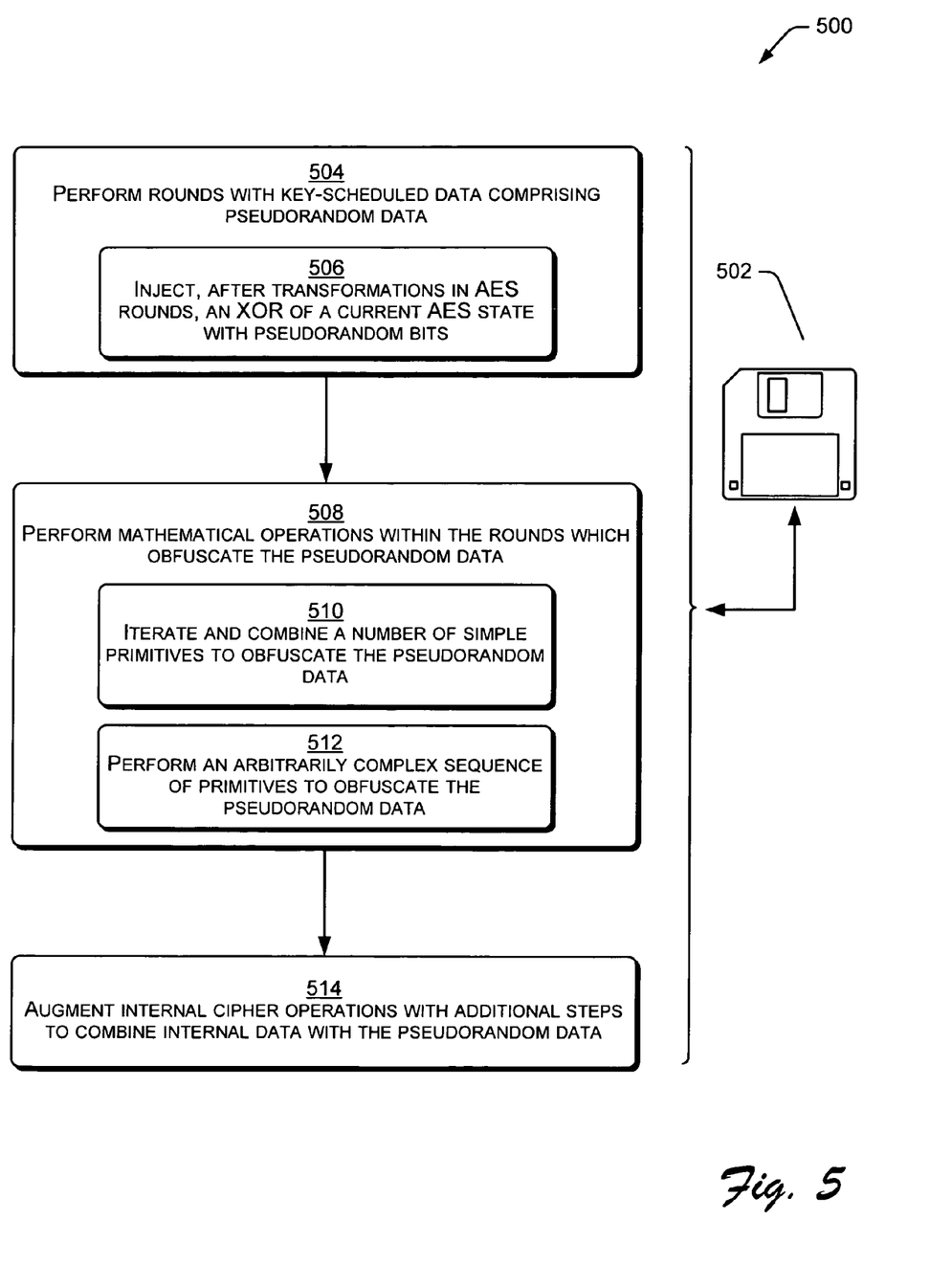
FIG. 5 is a flowchart showing an example method by which a white-box cipher can be operated.

FIG. 5 is a flowchart showing an example method 500 by which a white-box cipher can be created and/or operated. The method 500 is typically performed by application of computer-executable instructions, which may be stored on computer-readable media 502. Note that while the blocks of FIG. 5 are numbered and sequenced, this is not meant to suggest or imply that the order is required, since there is no single ordering of, or flow between, operations associated with the blocks 504-514. At block 504, rounds are performed with key-scheduled data formed from pseudorandom data. In contrast, block ciphers such as AES (Advanced Encryption Standard) expand the key for usage within each round. In an AES example, a 128-bit key uses a total of 1408 bits of key-derived data, representing 128 bits for an initial key addition, plus 128 bits for each of 10 rounds. The key-expansion (or key-scheduling) algorithm in the AES example is simple; accordingly, the key can be easily obtained from portions of the key-scheduled data. Consistent with block 504, the white-box code generator 102 of FIG. 1 replaces an original expanded key with the output of a cryptographic pseudorandom generator (PRNG), such as a stream cipher. The cipher key K 104 is used by the PRNG (pseudorandom number generator) 124 of the white-box code generator 102 to create pseudorandom data 112 for use in performing key-scheduling for rounds within the cipher 110. Accordingly, the white-box cipher code 110 has pseudorandom key-scheduling data, while an AES cipher input (e.g. a cipher contained within the configuration file 106) contains key-scheduling data from which the key may be easily derived. During operation of the white-box code generator 102 of FIG. 1, only the new (expanded pseudorandom) key 112, not the cipher key K 104, is included in the white-box code 110. With this technique, an adversary can no longer recover the AES key 104 from the expanded key, unless the PRNG 124 is broken. Moreover, the adversary cannot compress the expanded key into size comparable to the original AES key length.

At block 506, after data transformation performed by the round, an XOR of a current AES state with pseudorandom bits may be injected into the output data. For example, replacing key scheduling with pseudorandom data allows the original key (i.e. the seed for the pseudorandom data) to be hidden (separate from the white-box 110), which forces an adversary to recover at least the number of bits in the expanded key (e.g., 1408 bits for 128-bit AES). This number of bits may be extended further by incorporating additional reversible steps to combine internal cipher data with the pseudorandom stream. To require an adversary to make a minimum hack size, these reversible steps should be selected in such a way as to prevent reduction to simpler operations that combine, compress or discard parts of the pseudorandom data.

In the example of block 506, the rounds performed may be enhanced to obfuscate the message further. While the operations of blocks 504-506 require an adversary to deal with a large amount of key data, they do not inherently make the data difficult to locate and extract. To address this issue, code is generated (e.g. by the white-box code generator 102 of FIG. 1) that hides the key-stream bits (i.e. the pseudorandom data 112 used for key-scheduling) by incorporating the data into the mathematical operations performed by the cipher. For example, to hide multiplication of a binary word by 5, we can first left-shift the word twice (to multiply by 4) and then add this to the original value. While this example is very simple and not secure, the technique can be made to produce arbitrarily complex results, and to hide the pseudorandom key-scheduling data 112.

At block 508, mathematical operations are performed within the rounds that obfuscate the pseudorandom data. This makes the pseudorandom data much more difficult for an adversary to extract. A general methodology for producing obfuscated code from data includes iteration and combination of simple obfuscating transformations. Accordingly, at block 510 the pseudorandom data is obfuscated by iterating and combining a number of simple primitives. In particular, in iterated obfuscation, a number of simple primitives are derived to disguise computation (e.g., the above light obfuscation of multiplication by 5). At block 512, a sequence of primitives is performed to obfuscate the pseudorandom data. The sequence of primitives may be made arbitrarily complex, such as by using iteration and recombination, to result in any user-selected level of security. In one example, the level of complexity is a user-selected parameter. Moreover, at block 514 internal cipher operations may be augmented with additional steps to combine internal data with the pseudorandom data.

Exemplary Computing Environment

Figure 6:
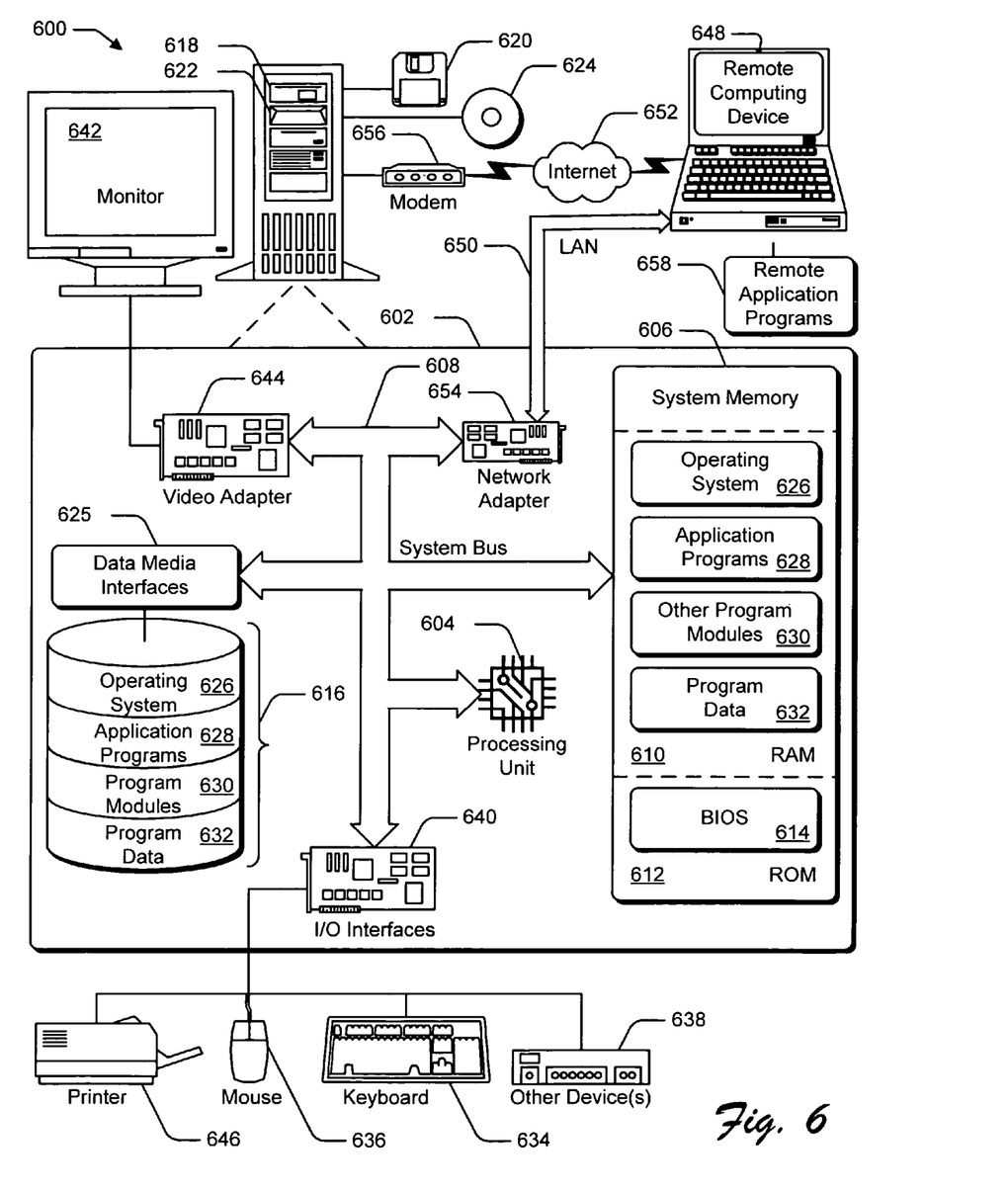
FIG. 6 illustrates an exemplary computing environment suitable for implementing configuring and/or operating a white-box cipher.

FIG. 6 illustrates an exemplary computing environment suitable for creating and operating white-box cipher code. The computing environment 600 includes a general-purpose computing system in the form of a computer 602. The components of computer 602 can include, but are not limited to, one or more processors or processing units 604, a system memory 606, and a system bus 608 that couples various system components including the processor 604 to the system memory 606. The system bus 608 represents one or more of any of several types of bus structures, including a memory bus or memory controller, a peripheral bus, a Peripheral Component Interconnect (PCI) bus, an accelerated graphics port, and a processor or local bus using any of a variety of bus architectures.

Computer 602 typically includes a variety of computer readable media. Such media can be any available media that is accessible by computer 602 and includes both volatile and non-volatile media, removable and non-removable media. The system memory 606 includes computer readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612. RAM 610 typically contains data and/or program modules that are immediately accessible to and/or presently operated on by the processing unit 604.

Computer 602 can also include other removable/non-removable, volatile/non-volatile computer storage media. By way of example, FIG. 10 illustrates a hard disk drive 616 for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, non-volatile optical disk 624 such as a CD-ROM, DVD-ROM, or other optical media. The hard disk drive 616, magnetic disk drive 618, and optical disk drive 622 are each connected to the system bus 608 by one or more data media interfaces 625. Alternatively, the hard disk drive 616, magnetic disk drive 618, and optical disk drive 622 can be connected to the system bus 608 by a SCSI interface (not shown).

The disk drives and their associated computer-readable media provide non-volatile storage of computer readable instructions, data structures, program modules, and other data for computer 602. Although the example illustrates a hard disk 616, a removable magnetic disk 620, and a removable optical disk 624, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 616, magnetic disk 620, optical disk 624, ROM 612, and/or RAM 610, including by way of example, an operating system 626, one or more application programs 628, other program modules 630, and program data 632. Each of such operating system 626, one or more application programs 628, other program modules 630, and program data 632 (or some combination thereof) may include an embodiment of a caching scheme for user network access information.

Computer 602 can include a variety of computer/processor readable media identified as communication media. Communication media typically embodies computer readable instructions, data structures, program modules, or other data transport mechanism, such as removable magnetic memory media 620, removable optical memory media 624, system memory 606, a hard disk drive 616 or other memory device. Combinations of any of the above are also included within the scope of computer readable media.

A user can enter commands and information into computer system 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device can also be connected to the system bus 608 via an interface, such as a video adapter 644. In addition to the monitor 642, other output peripheral devices can include components such as speakers (not shown) and a printer 646 that can be connected to computer 602 via the input/output interfaces 640.

Computer 602 can operate in a networked environment using logical connections to one or more remote computers, such as a remote computing device 648. By way of example, the remote computing device 648 can be a personal computer, portable computer, a server, a router, a network computer, a peer device or other common network node, and the like. The remote computing device 648 is illustrated as a portable computer that can include many or all of the elements and features described herein relative to computer system 602.

Logical connections between computer 602 and the remote computer 648 are depicted as a local area network (LAN) 650 and a general wide area network (WAN) 652. Such networking environments are commonplace in offices, enterprise-wide computer networks, intranets, and the Internet. When implemented in a LAN networking environment, the computer 602 is connected to a local network 650 via a network interface or adapter 654. When implemented in a WAN networking environment, the computer 602 typically includes a modem 656 or other means for establishing communications over the wide network 652. The modem 656, which can be internal or external to computer 602, can be connected to the system bus 608 via the input/output interfaces 640 or other appropriate mechanisms. It is to be appreciated that the illustrated network connections are exemplary and that other means of establishing communication link(s) between the computers 602 and 648 can be employed.

In a networked environment, such as that illustrated with computing environment 600, program modules depicted relative to the computer 602, or portions thereof, may be stored in a remote memory storage device. By way of example, remote application programs 658 reside on a memory device of remote computer 648. For purposes of illustration, application programs and other executable program components, such as the operating system, are illustrated herein as discrete blocks, although it is recognized that such programs and components reside at various times in different storage components of the computer system 602, and are executed by the data processor(s) of the computer.

CONCLUSION

Although aspects of this disclosure include language specifically describing structural and/or methodological features of preferred embodiments, it is to be understood that the appended claims are not limited to the specific features or acts described. Rather, the specific features and acts are disclosed only as exemplary implementations, and are representative of more general concepts.

The invention claimed is:

1. A computer-implemented method for configuring a white-box cipher, the computer-implemented method comprising:
   configuring pseudorandom data derived from a key to perform key-scheduling functionality; and
   generating white-box executable code, the code hiding the pseudorandom data by incorporating it into mathematical operations performed during executing rounds, the executing rounds comprising using key-scheduled data in the executing, and injecting, after transformations in AES rounds, an XOR of a current AES state with pseudorandom bits, thereby providing additional bits for an adversary to recover, boundaries of the AES rounds being blurred by scrambling code and data elements, the white-box executable code comprising code segments configured according to at least two tracks, only one of the tracks in each round being actually useful for operation of the white-box cipher, and other tracks serving to obfuscate round boundaries, the generating of the white-box executable code comprising:
   extending a number of bits an adversary must recover by incorporating reversible steps to combine internal cipher data with the pseudorandom data;
   setting a user-specified security parameter defining a number of bits in the pseudorandom data, the bits configured so that the number of bits provides a lower bound on an amount of key data an adversary must extract in order to emulate operation of the white-box executable code;
   performing a brute-force search over short instruction sequences to find ones that implement a given operation and use the one found within the white-box executable code; and
   providing a user-selectable choice to create white-box cipher code or compact cipher code, and in response to user-selection of white-box cipher code, obfuscating pseudorandom data within the white-box cipher code, the compact cipher code containing the key within the compact cipher code.

2. The computer-implemented method of claim 1, wherein configuring pseudorandom data comprises:
   using an AES key as input to a pseudorandom number generator to produce the pseudorandom data, wherein the pseudorandom data produced is larger than the key.

3. The computer-implemented method of claim 1, wherein generating white-box executable code comprises:
   devising a number of simple primitives to disguise computation, wherein iteration and recombination of the simple primitives obfuscate the pseudorandom data within the white-box executable code.

4. The computer-implemented method of claim 1, wherein the at least two tracks are scrambled in a random manner for inclusion in a dynamic data structure, and wherein the dynamic data structure is configured such that a position of data position within the dynamic data structure does not reveal a round from which the data was generated.

5. The computer-implemented method of claim 1, wherein generating the white-box executable code additionally comprises:
   scrambling code and data elements, including variables and tables, within the white-box executable code and inserting the scrambled elements into a dynamic data structure, thereby blurring boundaries of rounds performed by the white-box executable code.

6. One or more computer-readable media comprising computer-executable instructions for operating a white-box cipher, the computer-executable instructions comprising instructions for:
   storing, in a memory communicatively coupled to a processor, computer-executable instructions for performing the method of operating the white-box cipher;
   executing the instructions on the processor;
   according to the instructions being executed:
   configuring pseudorandom data derived from a key to perform key-scheduling functionality, wherein configuring the pseudorandom data comprises using an AES key as input to a pseudorandom number generator to produce the pseudorandom data;
   generating white-box executable code, the generating hiding the pseudorandom data with the white-box executable code by incorporating it into mathematical operations performed during execution of rounds, the white-box executable code comprising code segments configured according to at least two tracks, only one of the tracks in each round actually being useful for the white-box cipher operation and other tracks serve to obfuscate round boundaries, the at least two tracks comprising a dynamic data structure configured such that data position within the dynamic data structure does not reveal a round from which the data was generated; and
   generating white-box executable code, the generating comprising:
   extending a number of bits an adversary must recover by incorporating reversible steps to combine internal cipher data with the pseudorandom data;
   setting a user-specified security parameter defining a number of bits in the pseudorandom data, wherein the bits are configured so that the number provides a lower bound on an amount of key data an adversary must extract in order to emulate operation of the white-box executable code;

performing a brute-force search over short instruction sequences to find ones that implement a given operation and use the one found within the white-box executable code; and providing a user-selectable choice to create white-box cipher code or compact cipher code, and in response to user-selection of white-box cipher code, obfuscating pseudorandom data within the white-box cipher code, wherein the compact cipher code contains the key within the compact cipher code;

performing rounds with key-scheduled data comprising pseudorandom data; and performing mathematical operations within the rounds which obfuscate the pseudorandom data.

7. The computer-readable media of claim 6, wherein performing rounds with key-scheduled data comprises:

injecting, after transformations in AES rounds, an XOR of a current AES state with pseudorandom bits, thereby providing additional bits for an adversary to recover.

8. The computer-readable media of claim 6, wherein performing mathematical operations comprises:

obfuscating the pseudorandom data by iterating and combining a number of simple primitives.

9. The computer-readable media of claim 6, wherein performing mathematical operations comprises:

performing an arbitrarily complex sequence of primitives to obfuscate the pseudorandom data according to a user-specified parameter.

10. The computer-readable media of claim 6, wherein performing mathematical operations comprises:

blurring boundaries of rounds performed by the white-box by scrambling code and data elements within the white-box executable code and inserting the scrambled code and data elements into a dynamic data structure.

11. The computer-readable media of claim 6, additionally comprising instructions for:

augmenting internal cipher operations with additional steps to combine internal data with the pseudorandom data.

12. The computer-readable media of claim 6, wherein performing the rounds using pseudorandom data for key scheduling decodes content input to the white-box cipher.

13. A system to configure a white-box cipher, comprising:

means for storing, in a memory communicatively coupled to a processor, computer-executable instructions for performing the method for configuring the white-box cipher;

means for executing the instructions on the processor;

means for according to the instructions being executed:

means for replacing key-scheduled data with pseudorandom data derived from a key, wherein the pseudorandom data is more voluminous than the key;

means for configuring code to perform rounds based on the pseudorandom data;

means for segregating the key from the code configured to perform the rounds;

means for providing a user-selectable choice to create white-box cipher code or compact cipher code, and in response to user-selection of white-box cipher code, obfuscating pseudorandom data within the white-box cipher code;

means for creation of white-box cipher code comprising:

means for extending a number of bits an adversary must recover by incorporating reversible steps to combine internal cipher data with the pseudorandom data;

means for setting a user-specified security parameter defining a number of bits in the pseudorandom data, the bits are configured so that the number provides a lower bound on an amount of key data an adversary must extract in order to emulate operation of the white-box executable code;

means for performing a brute-force search over short instruction sequences to find ones that implement a given operation and use the one found within the white-box executable code; and means for providing a user-selectable choice to create white-box cipher code or compact cipher code, and in response to user-selection of white-box cipher code, obfuscating pseudorandom data within the white-box cipher code, the compact cipher code containing the key within the compact cipher code;

means for blurring boundaries of the rounds performed by the code by scrambling code and data elements; and means for executing the rounds comprising means for using key-scheduled data in the executing, and injecting, after transformations in AES rounds, an XOR of a current AES state with pseudorandom bits, thereby providing additional bits for an adversary to recover.

14. The system of claim 13, additionally comprising:

means for obfuscating the pseudorandom data within mathematical operations performed by the white-box cipher.

* * * * *